Figure 1:
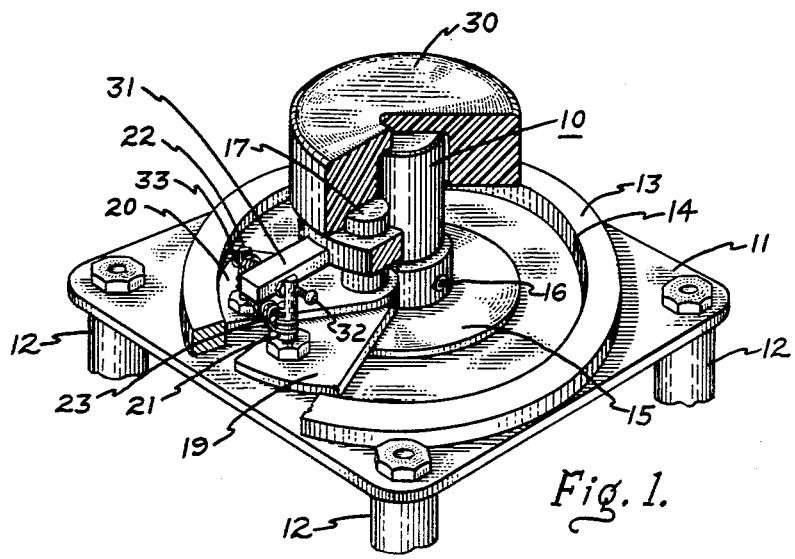

June 14, 1960 W. R. JUDD 2,940,564
SHAFT CONTROL MEANS
Filed Oct. 24, 1957

Inventor
Winston R. Judd,
by Gilbert P. Tarleton
His Attorney.

United States Patent Office 2,940,564
Patented June 14, 1960

2,940,564

SHAFT CONTROL MEANS

Winston R. Judd, Pittsfield, Mass., assignor to General Electric Company, a corporation of New York Filed Oct. 24, 1957, Ser. No. 692,154

4 Claims. (Cl. 192—8)

This invention relates to means for controlling the rotation of a shaft, and more in particular to means whereby a shaft may be manually rotated from a control means but will not respond to torque generated remotely from the control means, the control means thereby serving to lock the shaft and prevent injury to personnel operating the control. While the invention is specifically disclosed in the following paragraphs as relating to a control for manually operated induction voltage regulators, it is not intended that the invention be limited to this application.

One form of induction voltage regulator is comprised essentially of a rotor and stator having windings, the windings being adapted to be connected to an electrical circuit whereby the voltage of the circuit will be determined by the angular position of the rotor. When current flows through the windings of the regulator, motor torque is generated in the rotor, and thus in order to maintain the position of the rotor and thereby maintain the voltage of the electric circuit, it is necessary to provide means for locking the rotor shaft. Since it is frequently desired to manually rotate the shaft to control the voltage, it is necessary that the locking means on the shaft be releasable.

When the shaft is being manually controlled, however, there is a danger that excessive torque will be generated internally of the regulator and if means are not provided for preventing it, the torque may result in rapid rotation of the shaft and possible injury to the operator.

In the past it has been conventional to employ a simple crank-worm drive to control the rotor shaft of induction voltage regulators. While this type of drive does provide the locking and safety features that are desired, it does not permit the rapid adjustment of the rotor shaft that is frequently desired for small manually operated induction voltage regulators.

It is therefore an object of this invention to provide a shaft control means permitting the rapid manual adjustment of a shaft at the control means but preventing rotation of the shaft by torque generated remotely from the control means.

It is also an object to provide a manually operated shaft control means permitting rapid adjustment of a shaft manually but locking the shaft against rotation effected by the generation of torque on the shaft remotely of the control, the control thereby preventing rotation of the shaft that may injure personnel operating the control.

Briefly stated, in accordance with one aspect of my invention, I provide a shaft control mechanism comprising a shaft, and a fixed annular friction member disposed coaxially with the shaft. The friction member is preferably disposed in a plane normal to the axis of the shaft. A pair of toggles are provided for movement in the plane of the friction member, and the toggles each have one end fixed to the shaft and their other ends resiliently held against the friction member. The end of the toggles bearing against the friction member are arranged to prevent rotation of the shaft in opposite directions. Means are provided for selectively disengaging the end of one of the toggles from the friction member to permit manual rotation of the shaft in one direction. The toggles may be arranged so that a member affixed to the shaft comprises an arm common to both toggles.

While the specification concludes with claims particularly pointing out and distinctly claiming the subject matter which I regard as my invention, it is believed that the invention will be better understood from the following description taken in connection with the accompanying drawing.

Figure 2:
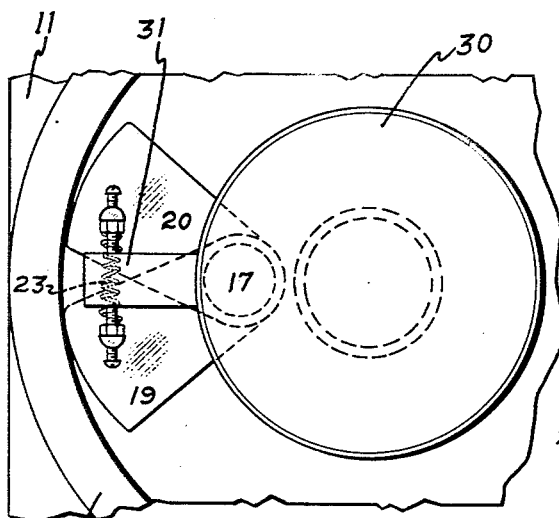
Figure 3:
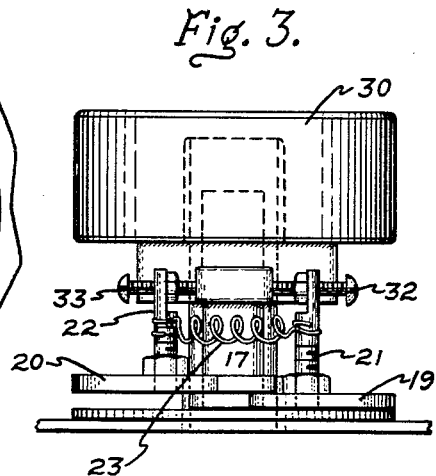

In the drawing:

Fig. 1 is a perspective partially cross-sectional view of a shaft control means according to my invention, Fig. 2 is an enlarged top view of a portion of the control means of Fig. 1, and Fig. 3 is an enlarged front view of the control means of Fig. 1 and illustrating the toggle and toggle release arrangement.

Referring now to the drawing, and more in particular to Fig. 1, therein is illustrated a shaft control mechanism for controlling rotation of a shaft 10. The shaft 10 extends through a plate 11, and the plate may be provided with corner studs 12 to facilitate mounting. For example, the shaft 10 may be the rotor shaft of an induction voltage regulator, and the corner studs 12 may serve to hold the plate 11 rigidly to the end of the frame of the regulator. An annular projection 13 is provided on one surface of the plate 11, the projection 13 having an annular internal surface 14 coaxial with the shaft 10 and disposed in a plane perpendicular to the axis of the shaft 10.

A hub 15 is rigidly affixed to the shaft 10, as by a set screw 16, and a hub shaft 17 is provided rigidly affixed to the hub 15 and extending parallel to the shaft 10. A pair of toggle arms 19 and 20 are pivoted on the hub shaft 17 and extend toward the annular friction surface 14. Thus, the arm 19 and the hub 15 form one toggle, and the arm 20 and the hub 15 form another toggle, the two toggles having the hub 15 as a common arm. The length of the toggle arms 19 and 20 from the center of the hub shaft 17 to their outwardly extending ends is greater than the shortest distance from the axis of the hub shaft 17 to the surface 14, and the toggle arms 19 and 20 extend toward the surface 14 on opposite sides of the radius of the annular surface 14 intersecting the axis of the hub shaft 17. Projections, such as studs 21 and 22 are provided extending parallel to the hub shaft from the toggle arms 19 and 20 respectively, and resilient means such as a helical spring 23 affixed to the studs 21 and 22 holds the ends of the toggle arms 19 and 20 against the friction surface 14, the force preferably being sufficient to prevent chattering when the mechanism is subject to oscillatory torque.

A knob 30 loosely mounted on the end of the shaft 10 (i.e., the diameter of the cavity of the knob is slightly larger than the diameter of the shaft) is pivoted on the hub shaft 17, and carries a projection 31 extending between the studs 21 and 22.

The screws 32 and 33 extending through studs 21 and 22 respectively engage the knob projection 31.

In the position of the control mechanism as illustrated in the drawing, clockwise torque applied directly to the rotor shaft 10 will result in a clockwise force on the hub shaft 17. Since the end of the toggle arm 20 is held against the surface 14 by action of the spring 23, the force of the hub shaft 17 tends to straighten the toggle comprised of toggle arm 20 and the common toggle arm (i.e., the hub 15). Movement of the hub shaft is restrained, however, since the length of the toggle arm is greater than the distance between the hub shaft and surface 14, and increases in torque on the rotor shaft result only in increases in pressure and frictional forces between the toggle arm 20 and the surface 14. Therefore, the locking action is produced by the driving force on the rotor shaft, and the correct resistance to sliding movement at the surface 14 is guaranteed even if the torque of the motor shaft varies.

Any movement of the toggle arm 20 will therefore be pivotal movement about the hub shaft 17. For this reason it is preferred that the end of the toggle arm engaging the surface 14 be curved, with the center of curvature being displaced from the hub shaft generally in the direction that the hub shaft tends to move, so that any displacement of the hub shaft 17 causing the toggle arm to roll against the surface 14 results in increase in the effective toggle arm length, thereby maintaining a nearly constant toggle angle and preventing the toggle from approaching or passing dead center position. The curvature of the toggle arms also permits considerable wear of the engaging surface without appreciably affecting the angle of contact between the toggle arm and friction surface.

Movement of the rotor shaft 10 resulting from counterclockwise torque is similarly restrained by the action of the toggle arm 19. The toggle arms 19 and 20 are ineffectual, however, in preventing movement in the clockwise and counterclockwise directions respectively.

Since the knob 30 is loosely mounted on the end of the shaft 10, initial manual rotation of the knob results only in a pivotal movement about the hub shaft 17 until the aperture in the knob engages the shaft 10. For example, if it is desired to turn the rotor shaft in a clockwise direction, initial turning of the knob results only in a clockwise movement of the knob about the hub shaft 17. The projection 31 affixed to the knob 30 also rotates in a clockwise direction, and forces the screw 33 in the same direction to affect the lifting of the toggle arm 20 from the friction surface 14. The rotor shaft is then free to move in a clockwise direction since the toggle arm 19 is ineffectual in preventing movement in such direction. Upon further rotation of the knob the aperture of the knob engages the shaft so that the shaft turns with the knob.

Movement of the rotor shaft in the opposite direction by the knob 30 is accomplished in a similar manner, with the projection 31 serving to lift the toggle arm 19 from the friction surface 14.

If the rotor shaft is being manually rotated in one direction by means of a knob 30 and torque from another source is suddenly applied in the opposite direction on the rotor shaft, the toggle arm that is not lifted from the surface 14 will serve to prevent rotation of the shaft resulting from the sudden torque. For example, if the rotor shaft is being manually rotated clockwise, and a sudden counterclockwise torque is applied to the shaft, the toggle arm 19 will prevent counterclockwise rotation of the rotor shaft in response to the sudden torque. If, on the other hand, the sudden torque applied to the rotor shaft acts in the same direction that the shaft is being manually rotated, and if the sudden movement is faster than the movement caused by manual rotation, movement of the hub shaft 17 will result in the re-engagement of the toggle arm with the surface 14 and the consequent locking of the rotor shaft. Thus, if the rotor shaft 10 is being manually rotated in a clockwise direction, and a sudden torque is applied on the motor shaft in the same direction, if the sudden torque results in clockwise movement of the pin 17 faster than that provided by manual operation, a counterclockwise movement of the knob about the hub shaft 17 will result due to the loose fit between the rotor shaft and the knob 30. This counterclockwise movement of the knob about the hub shaft 17 serves to remove the lifting action of the projection 31 on the toggle arm 20, so that the toggle arm 20 re-engages the surface 14 and the rotor shaft is consequently locked against further clockwise rotation.

It will be understood, of course, that while the form of the invention herein shown and described constitutes the preferred embodiment of my invention, it is not intended herein to illustrate all of the possible equivalent forms or ramifications thereof. It will be understood that the words employed are words of description rather than of limitation, and that various changes may be made without departing from the spirit or scope of the invention herein disclosed, and it is aimed in the appended claims to cover all such changes as fall within the true spirit and scope of the invention.

What I claim as new and desire to secure by Letters Patent of the United States is:

1. A shaft control mechanism comprising a shaft, a fixed annular friction member coaxial with said shaft, a pair of toggles coplanar with said friction member having a common link, the pivotal axis of said toggles being parallel to said shaft, the end of said common link being fixed to said shaft for rotation therewith, the extended lengths of said toggles being greater than the distance between said shaft and friction member, the ends of the other links of said toggles resiliently engaging the radially inner surface of said friction member, said other links extending in opposite directions with respect to the lengthwise direction of said common link, a projection on each of said other links, and knob means disconnected from but loosely pivoted on said shaft so that said knob means and shaft are independently movable, said knob being pivoted on the axis of said toggles, and said knob having projection means selectively engaging said projections of said other links to disengage one of the ends of said other links from said friction member.

2. A shaft control mechanism comprising a first shaft, a fixed annular friction member coaxial with said first shaft, a second shaft extending between said first shaft and said friction member and parallel to said first shaft, said second shaft being mounted for rotation with said first shaft, a pair of oppositely extending toggle links pivoted on said second shaft and extending into resilient engagement with the inner surface of said friction member, a projection on each of said links, knob means pivoted on said second shaft, said knob means being disconnected from but loosely pivoted on said first shaft so that said knob and first shaft are independently movable, and release projection means on said knob extending between the projections of said links, said release projection means being arranged to selectively engage the projections of said links to disengage the ends of said links from said friction member.

3. A shaft control mechanism comprising a first shaft, a fixed annular friction member coaxial with said first shaft, a second shaft extending between said first shaft and said friction member and parallel to said first shaft, said second shaft being mounted for rotation with said first shaft, a pair of toggle links pivoted on said second shaft and extending into resilient engagement with the inner surface of said friction member, said links contacting said surface on opposite sides of the plane of the axes of said first and second shafts, a projection on each of said links extending parallel to said first shaft, knob means coaxial with said first shaft and having a central aperture loosely surrounding said first shaft but being disconnected therefrom so that said knob means and first shaft are independently movable, said knob means being pivoted on said second shaft, and release projection means on said knob extending between the projections of said links, said release projection means being arranged to selectively engage the projections of said links to disengage the ends of said links from said friction member.

4. In a shaft control mechanism of the type in which the shaft responds to sudden, excessive torques generated remotely from the control mechanism, the improvement in means for preventing injury of personnel operating a control knob comprising a fixed annular friction member coaxial with said shaft, a second shaft extending between the first mentioned shaft and said friction member, said second shaft being parallel to the first mentioned shaft, and mounted for rotation therewith, a pair of oppositely extending toggle links pivoted on said second shaft and extending into resilient engagement with the inner surface of said friction member, the extended lengths of said links being greater than the distance between said shaft and friction member, a projection on each of said links extending parallel to said first mentioned shaft, said control knob being pivotally mounted on said second shaft and having a central aperture therein coaxially receiving said first mentioned shaft, the diameter of said central aperture being slightly greater than the diameter of said first mentioned shaft so that said control knob and first mentioned shaft are separately movable independent of each other, a release projection affixed to said knob and extending between the projections on said links, and said release projection being pivoted about said second shaft with said knob to selectively engage the projections on said links for disengaging the ends of said links from said friction member.

References Cited in the file of this patent

UNITED STATES PATENTS

| | | |
|---|---|---|
| 363,472 | Lake | May 24, 1887 |
| 692,869 | Lemp | Feb. 11, 1902 |
| 945,909 | Chapman | Jan. 11, 1910 |
| 980,008 | Romines | Dec. 27, 1910 |
| 2,440,630 | Blocher | Apr. 27, 1948 |
| 2,475,159 | Spraragen | July 5, 1949 |
| 2,703,499 | Reid | Mar. 8, 1955 |

FOREIGN PATENTS

| | | |
|---|---|---|
| 384,026 | France | Jan. 23, 1908 |
| 481,511 | Canada | Mar. 4, 1952 |